Patented July 3, 1945

2,379,691

UNITED STATES PATENT OFFICE 2,379,691

REACTION PRODUCTS OF ALDEHYDES AND DIAZINE DERIVATIVES

Gaetano F. D'Alelio, Pittsfield, Mass., assignor to General Electric Company, a corporation of New York No Drawing. Application July 17, 1942, Serial No. 451,314

14 Claims. (Cl. 260—72)

This invention relates to the production of new synthetic materials and more particularly to new reaction products of particular utility in the plastics and coating arts. Specifically the invention is concerned with compositions of matter comprising the reaction product of (1) a chlorinated acetamide with (2) the product of partial reaction of ingredients comprising an aldehyde, including polymeric aldehydes, hydroxyaldehydes and aldehyde-addition products, e. g., formaldehyde, paraformaldehyde, dimethylol urea, trimethylol melamine, aldol, glycollic aldehyde, etc., and a diazine derivative corresponding to the following general formlua:

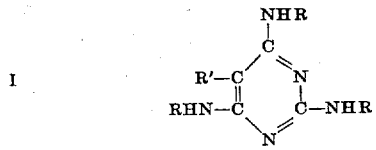

where R represents a monovalent hydrocarbon radical and R' represents a member of the class consisting of hydrogen and monovalent hydrocarbon radicals.

Illustrative examples of radicals that R and R' in the above formula may represent are: aliphatic (e. g., methyl, ethyl, propyl, isopropyl, butyl, secondary butyl, isobutyl, butenyl, amyl, isoamyl, hexyl, heptyl, octyl, decyl, tetradecyl, allyl, methallyl, ethallyl, crotyl, etc.), including cycloaliphatic (e. g., cyclopentyl, cyclopentenyl, cyclohexyl, cyclohexenyl, cycloheptyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); and aryl-substituted aliphatic (e. g., benzyl, phenylethyl, cinnamyl, phenylpropyl, phenylisopropyl, etc.). Of course it will be understood by those skilled in the art that R and R' may represent any other monovalent aliphatic (e. g., alkyl, alkenyl) hydrocarbon radical or monovalent aromatic hydrocarbon radical, and that the radicals mentioned are by way of illustration and not by way of limitation. Preferably R' represents hydrogen. Instead of the hydrocarbon-substituted amino pyrimidines (1,3-diazines) represented by the above formula, corresponding derivatives of the 1,2-diazines or of the 1,4-diazines may be employed.

The diazine derivatives used in practicing the present invention conveniently are prepared by condensing the corresponding tri-chloro (or tri-bromo) pyrimidine with a primary amine. This reaction may be represented by the following general equation, where R and R' have the same meanings as given above with reference to Formula I:

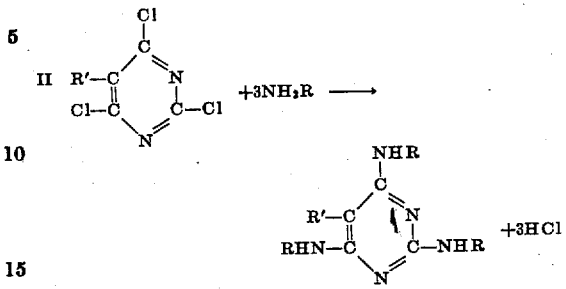

Another suitable method of preparation comprises effecting reaction between the corresponding tri-amino pyrimidine and an inorganic acid mono salt of a primary amine, for example the mono-hydrochloride of a primary amine. This reaction may be represented by the following general equation, where R and R' have the same meanings as given above with reference to Formula I:

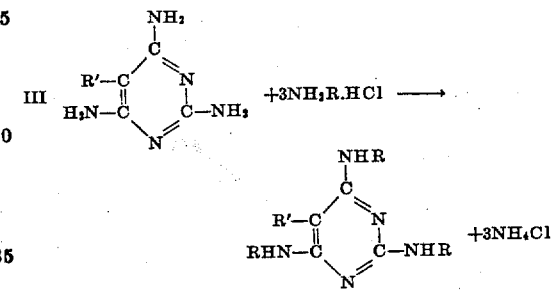

Specific examples of diazine derivatives embraced by Formula I that may be used in producing my new compositions are listed below:

2,4,6-tri(methylamino) pyrimidine
2,4,6-tri-(methylamino) 5-methyl pyrimidine
2,4,6-tri-(ethylamino) pyrimidine
2,4,6-tri-(ethylamino) 5-phenyl pyrimidine
2,4,6-tri-(phenylamino) pyrimidine
2,4,6-tri-(phenylamino) 5-phenyl pyrimidine
2,4,6-tri-(tolylamino) pyrimidine
2,4,6-tri-(allylamino) pyrimidine
2,4,6-tri-(propylamino) pyrimidine
2,4,6-tri-(isopropylamino) pyrimidine
2,4,6-tri-(tolylamino) 5-methyl pyrimidine
2,4,6-tri-(cyclohexylamino) pyrimidine
2,4,6-tri-(cyclohexenylamino) 5-ethyl pyrimidine
2,4,6-tri-(butylamino) pyrimidine
2,4,6-tri-(pentylamino) 5-xenyl pyrimidine 2,4,6-tri-(propenylamino) pyrimidine
2,4,6-tri-(naphthylamino) pyrimidine
2,4,6-tri-(hexylamino) 5-hexyl pyrimidine
2,4,6-tri-(benzylamino) 5-cyclohexyl pyrimidine
2,4,6-tri-(phenethylamino) pyrimidine
2,4,6-tri-(ethylphenylamino) pyrimidine
2,4,6-tri-(xenylamino) 5-cyclohexenyl pyrimidine
2,4,6-tri-(xylylamino) pyrimidine
2,4,6-tri-(decylamino) pyrimidine
2,4,6-tri-(tetradecylamino) pyrimidine
2,4,6-tri-(hexylamino) 5-tolyl pyrimidine
2,4,6-tri-(methylamino) 5-ethyl pyrimidine
2,4,6-tri-(ethylamino) 5-methyl pyrimidine
2,4,6-tri-(methylamino) 5-allyl pyrimidine
2-(methylamino) 4,6-di-(ethylamino) pyrimidine
2-(ethylamino) 4,6-di-(phenylamino) pyrimidine
2-(allylamino) 4,6-di-(propylamino) 5-methyl pyrimidine
2-(butylamino) 4,6-di-(allylamino) 5-phenyl pyrimidine
2,4,6-tri-(phenylamino) 5-methallyl pyrimidine
2,4,6-tri-(tolylamino) 5-naphthyl pyrimidine
2,4,6-tri-(2'-butenylamino) pyrimidine
2,4,6-tri-(heptylamino) pyrimidine
2,4,6-tri-(isobutylamino) pyrimidine
2,4,6-tri-(isoamylamino) 5-isoamyl pyrimidine The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and diazine derivatives of the kind embraced by Formula I, numerous examples of which have been given above. Thereafter a curing reactant, specifically a chlorinated acetamide, is caused to react with this initial reaction product.

In the production of molded articles from molding compositions comprising a filled or unfilled thermosetting resin, it is highly desirable that the molding compound have a high plastic flow during molding combined with a rapid cure to an insoluble, infusible state. Surprisingly it was found that the heat-curable resinous condensation products of this invention show excellent flow characteristics during a short curing cycle. The molded articles have a high dielectric strength and very good resistance to arcing. They have a good surface finish and excellent resistance to water, being better, in general, than the ordinary urea-formaldehyde resins in this respect. Their water resistance also is materially better than that of resins made by reaction of an aldehyde with similar diazine derivatives wherein the amino radical is unsubstituted. This was quite surprising and unexpected and in no way could have been predicted. The cured resins of the present invention also have a high resistance to heat and abrasion and, therefore, are especially suitable for use where optimum heat- and abrasion-resistance are properties of primary importance.

It has been suggested heretofore that resinous condensation products be made by condensing an aliphatic aldehyde containing not more than four carbon atoms with a compound corresponding to the general formula IV 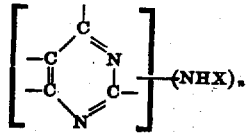

wherein $n$ is at least 2, X stands for a member of the group consisting of H and —$NH_2$ and wherein, to the carbon atoms, are attached members of the class consisting of the aforesaid —NHX groups, hydrogen, alkyl, phenyl, phenylene, hydroxy, alkoxy, mercapto, thioether and substituted amino groups. A more specific example of the prior art materials coming within the above class are condensation products of an aliphatic aldehyde, specifically formaldehyde, with 2,4,6-triamino pyrimidine, V 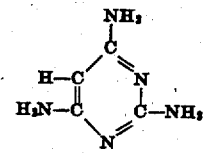

Although such resins have valuable properties and are suitable for many applications, their water resistance is often inadequate for many electrically insulating uses and other applications of the cured resin or of molded articles made from molding compositions containing the thermosetting resin. Furthermore, the plasticity of the heat-curable resin and of molding compounds prepared therefrom often is unsatisfactory for molding many articles, particularly articles of intricate design the successful molding of which requires high plasticity of the molding compound during molding in order that the compound will flow rapidly and uniformly to all parts of the mold. These and other disadvantages in the materials of the above-mentioned class are avoided by using as a starting reactant a diazine derivative of the kind embraced by Formula I. The diazine derivatives used in practicing the present invention therefore are not the equivalent of the compounds embraced by Formula IV and exemplified by 2,4,6-triamino pyrimidine (Formula V).

In practicing my invention the initial condensation reaction may be carried out at normal or at elevated temperatures, at atmospheric, subatmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence of solvents or diluents, fillers, other natural or synthetic resinous bodies, or while admixed with other materials that also can react with the aldehydic reactant or with the diazine derivatives, e. g., urea ($NH_2CONH_2$), thiourea, selenourea and iminourea (guanidine), substituted ureas, thioureas, selenoureas and iminoureas, more particularly urea derivatives such as mentioned, for example, in my Patent No. 2,285,418, page 1, column 1, lines 41-49; monoamides of monocarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminotriazines, e. g., melamine, ammeline, ammelide, melem, melam, melon, numerous other examples being given in various copending applications of mine, for instance in my copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in my Patent No. 2,239,441; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the diazine derivative to form an intercondensation product by mixing all the reactants and effecting condensation therebetween or by var'ous permutations of reactants as described, for example, in my Patent No. 2,285 418 with particular reference to reactions involving a urea, an aliphatic aldehyde and a chlorinated acetamide. For example, I may form a partial condensation product of ingredients comprising (1) urea or melamine or urea and melamine, (2) a diazine derivative of the kind embraced by Formula I, for instance a 2,4,6-tri-(alkylamino) pyrimidine, a 2,4,6-tri-(arylamino) pyrimidine, a 2,4,6-tri-(alkylamino) 5-alkyl pyrimidine, a 2,4,6-tri-(alkylamino) 5-aryl pyrimidine, a 2,4,6-tri-(arylamino) 5-alkyl pyrimidine, a 2,4,6-tri-(arylamino) 5-aryl pyrimidine, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| 2,4,6-tri-(methylamino) pyrimidine | 41.8 |
| Aqueous formaldehyde (approx. 37.1% HCHO) | 60.3 |
| Aqueous ammonia (approx. 28% $NH_3$) | 1.5 |
| Sodium hydroxide in 10 parts water | 0.1 |
| Chloroacetamide (monochloroacetamide) | 0.25 |

All of the above ingredients with the exception of the chloroacetamide were heated together under reflux at the boiling temperature of the mass for 20 minutes. The chloroacetamide was now added and heating under reflux was continued for an additional 5 minutes. The resulting hot resinous syrup was mixed with 40 parts alpha cellulose in flock form and 0.2 part of a mold lubricant, specifically zinc stearic, to form a molding (moldable) compound. The wet molding composition was dried at room temperature until sufficient moisture had been removed to provide a material that could be molded satisfactorily. A well-cured molded piece having very good water resistance was produced by molding a sample of the dried and ground molding compound for 2 minutes at 150° C. under a pressure of 2,000 pounds per square inch. The molding compound showed very good flow characteristics during molding as evidenced by the amount of flash on the molded piece.

Instead of using chloroacetamide (monochloroacetamide) in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, glycine, sulfamic acid, citric diamide, phenacyl chloride, etc.).

*Example 2*

| | Parts |
|---|---|
| 2,4,6-tri-(methylamino) pyrimidine | 20.9 |
| Dimethylol urea (commercial grade containing approx. 11% by weight of water) | 50.7 |
| Aqueous ammonia (approx. 28% NH₃) | 3.0 |
| Sodium hydroxide in 5 parts water | 0.2 |
| Water | 50.0 |
| Chloroacetamide | 0.5 |

All of the above ingredients with the exception of the chloroacetamide were heated together under reflux at the boiling temperature of the mass for 20 minutes. The chloroacetamide was now added and heating under reflux was continued for an additional 3 minutes. A molding compound was made from the resulting resinous syrup by mixing therewith 45 parts alpha cellulose and 0.3 part zinc stearate. The wet molding composition was dried at 60° C. for 2½ hours. A well-cured molded piece having good water resistance was obtained by molding a sample of the dried and ground molding compound for 2 minutes at 150° C. under a pressure of 2,000 pounds per square inch. The molding compound showed good plastic flow during molding.

*Example 3*

| | Parts |
|---|---|
| 2,4,6-tri-(methylamino) pyrimidine | 8.4 |
| Urea | 27.0 |
| Aqueous ammonia (approx. 28% NH₃) | 3.0 |
| Aqueous formaldehyde (approx. 37.1% HCHO) | 20.5 |
| Sodium hydroxide in 5 parts water | 0.02 |
| Chloroacetamide | 0.5 |

All of the above ingredients with the exception of the chloroacetamide were heated together under reflux at boiling temperature for 30 minutes. At the end of this period of time the above-stated amount of chloroacetamide was added and refluxing was continued for an additional 8 minutes. The resulting hot resinous syrup was mixed with 35 parts alpha cellulose and 0.2 part zinc stearate to form a molding compound. The wet molding composition was dried at 60° C. for 1½ hours. A sample of the dried and ground molding compound was molded for 3 minutes at 135° C. under a pressure of 2,000 pounds per square inch. The molded piece was well cured throughout and had a well-knit and homogeneous structure. It had very good resistance to water. The molding compound showed excellent plastic flow during molding.

*Example 4*

| | Parts |
|---|---|
| 2,4,6-tri-(methylamino) pyrimidine | 20.9 |
| Para-ureido benzene and sulfonamide | 26.9 |
| Aqueous formaldehyde (approx. 37.1% HCHO) | 60.3 |
| Aqueous ammonia (approx. 28% NH₃) | 1.5 |
| Sodium hydroxide in 1.5 parts water | 0.01 | were heated together under reflux at the boiling temperature of the mass for 8 minutes. At the end of this period of time a white resin had formed and had precipitated from the solution. This resin melted when heated on a 150° C. hot plate and would not cure to an insoluble and infusible state in the absence of a curing agent. However, the resin was potentially heat-curable as shown by the fact that when from 1 to 2% by weight of glycine, chloroacetamide or other curing agent such as mentioned under Example 1 was incorporated into the resin, followed by heating on a 150° C. hot plate, the resin cured to an infusible mass.

*Example 5*

| | Parts |
|---|---|
| 2,4,6-tri-(methylamino) pyrimidine | 8.4 |
| Butyl alcohol | 18.5 |
| Aqueous formaldehyde (approx. 37.1% HCHO) | 12.1 |
| Sodium hydroxide in 0.5 part water | 0.01 | were heated together under reflux at the boiling temperature of the mass for 15 minutes, at the end of which period of time a white precipitate had formed in the resulting syrup. When a sample of this syrup was heated on a 150° C. hot plate it did not cure to an insoluble and infusible state. The addition of from 1 to 2% by weight of glycine, chloroacetamide or other curing agent such as mentioned under Example 1 yielded a resinous composition that cured slowly to an infusible mass when heated on a 150° C. hot plate. When a portion of the initial syrupy condensation product was dehydrated, a resinous mass was obtained that was soluble in ethyl alcohol and other organic solvents. The solubility and film-forming characteristics of the resinous composition of this example make it especially suitable for use in the preparation of coating and impregnating compositions. For example, it may be used in the production of spirit and baking varnishes. It may be employed as a modifier of varnishes of the aminoplast and alkyd-resin types.

*Example 6*

| | Parts |
|---|---|
| 2,4,6-tri-(methylamino) pyrimidine | 8.4 |
| Acetamide | 3.0 |
| Aqueous formaldehyde (approx. 37.1% HCHO) | 20.3 |
| Aqueous ammonia (approx. 28% NH₃) | 0.6 |
| Sodium hydroxide in 1 part water | 0.01 | were heated together under reflux at the boiling temperature of the mass for 15 minutes, yielding a clear, resinous syrup that did not cure to an insoluble and infusible state when a sample of it was heated on a 150° C. hot plate. A thermosetting composition was obtained by incorporating into the syrupy condensation product from 1 to 2% by weight of glycine, chloroacetamide or other curing agent such as mentioned under Example 1. The cured film was relatively soft, indicating the plasticizing effect of the acetamide on the cured composition. The properties of the resinous material of this example make it particularly suitable for use as a modifier of less plastic aminoplasts and other resinous materials of unsatisfactory flow characteristics to improve their plasticity.

*Example 7*

| | Parts |
|---|---|
| 2,4,6-tri(methylamino) pyrimidine | 8.4 |
| Diethyl malonate | 8.0 |
| Aqueous formaldehyde (approx. 37.1% HCHO) | 20.3 |
| Aqueous ammonia (approx. 28% NH₃) | 0.6 |
| Sodium hydroxide in 2 parts water | 0.01 | were heated together under reflux at the boiling temperature of the mass for 10 minutes, at the end of which period of time a white, resinous solid had separated from the mass. This resinous solid was thermoplastic as indicated by the fact that it melted when a sample of it was heated on a 150° C. hot plate. The addition of from 1 to 2% by weight of glycine, chloroacetamide or other curing agent such as mentioned under Example 1 to the resinous material, followed by heating on a 150° C. hot plate, caused the resin to cure to a hard, insoluble and infusible state.

Example 8

| | Parts |
|---|---|
| 2,4,6-tri-(methylamino) pyrimidine | 8.4 |
| Glycerine | 4.6 |
| Aqueous formaldehyde (approx. 37.1% HCHO) | 20.3 |
| Sodium hydroxide in 1 part water | 0.01 | were heated together under reflux at the boiling temperature of the mass for 15 minutes, yielding a clear, resinous syrup. This syrup was non-curing when heated on a 135° C. hot plate, but cured readily to an insoluble and infusible state upon the addition of from 1 to 2% by weight of glycine, chloroacetamide or other curing agent such as mentioned under Example 1.

Example 9

| | Parts |
|---|---|
| 2,4,6-tri-(methylamino) pyrimidine | 16.7 |
| Acrolein | 16.8 |
| Sodium hydroxide in 30 parts water | 0.02 | were heated together under reflux at the boiling temperature of the mass for 10 minutes. The resulting resinous syrup was non-curing when a sample of it was heated on a 150° C. hot plate. The addition of from 1 to 2% by weight of glycine, sulfamic acid, chloroacetamide or other curing agent such as mentioned under Example 1 to the resinous syrup, followed by heating on a 150° C. hot plate, caused the resin to cure slowly to an insoluble and infusible state.

Example 10

| | Parts |
|---|---|
| 2,4,6-tri-(methylamino) pyrimidine | 16.7 |
| Polyvinyl alcohol | 26.4 |
| Aqueous formaldehyde (approx. 37.1% HCHO) | 24.1 |
| Sodium hydroxide in 2 parts water | 0.01 |

All of the above ingredients were mixed and heated under reflux at boiling temperature for 10 minutes, yielding a clear, resinous syrup. A clear, thermoplastic film was obtained when a sample of the resinous syrup was heated on a 150° C. hot plate. The addition of a small amount of a curing agent, specifically hydrochloric acid, to the resinous syrup or to the thermoplastic resin yielded a composition that cured to an insoluble and infusible state when heated on a 150° C. hot plate. The resinous composition of this example may be used in the production of molding compounds and in the preparation of coating and impregnating compositions.

It will be understood, of course, by those skilled in the art that the reaction between the aldehyde and the diazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 10, inclusive, at boiling temperature under reflux, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that my invention is not limited to condensation products obtained by reaction of ingredients comprising an aldehyde and the specific hydrocarbon-substituted amino diazine named in the above illustrative examples. Thus, instead of 2,4,6-tri-(methylamino) pyrimidine, I may use 2,4,6-tri-(ethylamino) pyrimidine or other 2,4,6-tri-(alkylamino) pyrimidines, 2,4,6-tri-(phenylamino) pyrimidine (2,4,6-tri-anilino pyrimidine), 2,4,6-tri-(tolylamino) pyrimidine (2,4,6-tri-toluido pyrimidine), or other 2,4,6-tri-(arylamino) pyrimidines, or any other compound of the kind embraced by Formula I, numerous examples of which have been given hereinbefore.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N)carbinol) derivatives, more particularly the mono- and poly-methylol derivatives of urea, thiourea, selenourea and iminourea, and of subtsituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazines, of the aminotriazoles, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending upon the particular properties desired in the finished product. Ordinarily these reactants are employed in an amount corresponding to at least one mol of the aldehyde, specifically formaldehyde, for each mol of the diazine derivative. Thus, I may use, for example, from 1 to 6 or 7 or more mols of an aldehyde for each mol of the diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 12 or 15 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, including halogenated acylated ureas of the kind described, for example, in D'Alelio Patent No. 2,281,559; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc.; polyvinyl ethers, including polyvinyl acetals, specifically polyvinyl formal, etc.

Instead of effecting reaction between a diazine derivative of the kind embraced by Formula I and an aldehyde, specifically formaldehyde, I may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, polyacrylic, methacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The unmodified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of (1) a chlorinated acetamide with (2) the product of partial reaction of ingredients comprising an aldehyde and a compound corresponding to the general formula

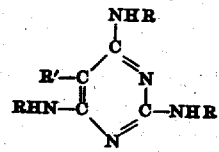

where R represents a monovalent hydrocarbon radical and R' represents a member of the class consisting of hydrogen and monovalent hydrocarbon radicals.

2. A composition as in claim 1 wherein the aldehyde is formaldehyde.

3. A composition as in claim 1 wherein R' represents hydrogen.

4. A heat-curable composition comprising the heat-convertible resinous reaction product of (1) a partial condensation product of ingredients comprising formaldehyde and a compound corresponding to the general formula

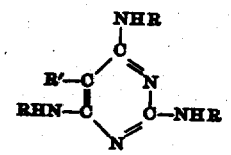

where R represents a monovalent hydrocarbon radical and R' represents a member of the class consisting of hydrogen and monovalent hydrocarbon radicals, and (2) a chlorinated acetamide.

5. A product comprising the cured composition of claim 4.

6. A composition as in claim 4 wherein the chlorinated acetamide is monochloroacetamide.

7. A composition as in claim 4 wherein R' represents hydrogen.

8. A resinous composition comprising the reaction product of (1) a chlorinated acetamide with (2) the product of partial reaction of ingredients comprising formaldehyde and 2,4,6-tri-(methylamino) pyrimidine.

9. A resinous composition comprising the reaction product of (1) a chlorinated acetamide with (2) the product of partial reaction of ingredients comprising formaldehyde and 2,4,6-tri-(phenylamino) pyrimidine.

10. A resinous composition comprising the reaction product of (1) a chlorinated acetamide with (2) the product of partial reaction of ingredients comprising formaldehyde and 2,4,6-tri-(tolylamino) pyrimidine.

11. A composition comprising the reaction product of (1) a chlorinated acetamide with (2) the product of partial reaction, under alkaline conditions, of ingredients comprising a urea, an aldehyde and a compound corresponding to the general formula

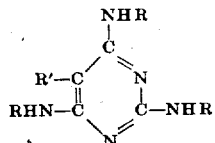

where R represents a monovalent hydrocarbon radical and R' represents a member of the class consisting of hydrogen and monovalent hydrocarbon radicals.

12. A composition as in claim 11 wherein R' represents hydrogen, the aldehyde is formaldehyde and the urea component is the compound corresponding to the formula $NH_2CONH_2$.

13. A composition comprising the reaction product of (1) a chlorinated acetamide with (2) the product of partial reaction, under alkaline conditions, of ingredients comprising an aminotriazine, an aldehyde and a compound corresponding to the general formula

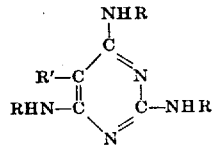

where R represents a monovalent hydrocarbon radical and R' represents a member of the class consisting of hydrogen and monovalent hydrocarbon radicals.

14. The method of preparing new synthetic compositions which comprises effecting partial reaction between ingredients comprising an aldehyde and a compound corresponding to the general formula

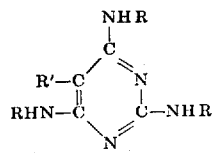

where R represents a monovalent hydrocarbon radical and R' represents a member of the class consisting of hydrogen and monovalent hydrocarbon radicals, adding a chlorinated acetamide to the resulting partial reaction product, and causing the said chlorinated acetamide to react with the said partial reaction product.

GAETANO F. D'ALELIO.

CERTIFICATE OF CORRECTION.

Patent No. 2,379,691.            July 3, 1945.

GAETANO F. D'ALELIO.

It is hereby certified that error appears in the printed specification of the above numbered patent requiring correction as follows: Page 3, first column, line 3, after "acetic" insert a comma; line 14, for "derivatives" read --derivative--; and second column, line 50, for "stearic" read --stearate--; page 4, first column, line 63, after "benzene" strike out "and"; page 5, second column, line 42, for "poly-(N)carbinol" read --poly-(N-carbinol)--; line 45, for "subtsituted" read --substituted--; page 6, first column, line 50, for "poylvinyl" read --polyvinyl--; line 64, for "comphoric" read --camphoric--; and that the said Letters Patent should be read with this correction therein that the same may conform to the record of the case in the Patent Office.

Signed and sealed this 9th day of October, A. D. 1945.

Leslie Frazer (Seal)            First Assistant Commissioner of Patents.

10. A resinous composition comprising the reaction product of (1) a chlorinated acetamide with (2) the product of partial reaction of ingredients comprising formaldehyde and 2,4,6-tri-(tolylamino) pyrimidine.

11. A composition comprising the reaction product of (1) a chlorinated acetamide with (2) the product of partial reaction, under alkaline conditions, of ingredients comprising a urea, an aldehyde and a compound corresponding to the general formula

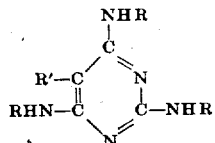

where R represents a monovalent hydrocarbon radical and R' represents a member of the class consisting of hydrogen and monovalent hydrocarbon radicals.

12. A composition as in claim 11 wherein R' represents hydrogen, the aldehyde is formaldehyde and the urea component is the compound corresponding to the formula $NH_2CONH_2$.

13. A composition comprising the reaction product of (1) a chlorinated acetamide with (2) the product of partial reaction, under alkaline conditions, of ingredients comprising an aminotriazine, an aldehyde and a compound corresponding to the general formula

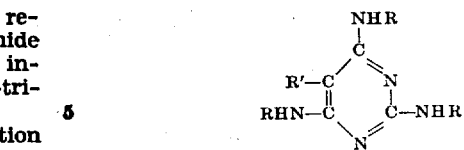

where R represents a monovalent hydrocarbon radical and R' represents a member of the class consisting of hydrogen and monovalent hydrocarbon radicals.

14. The method of preparing new synthetic compositions which comprises effecting partial reaction between ingredients comprising an aldehyde and a compound corresponding to the general formula

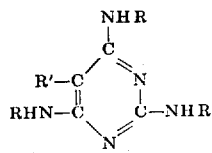

where R represents a monovalent hydrocarbon radical and R' represents a member of the class consisting of hydrogen and monovalent hydrocarbon radicals, adding a chlorinated acetamide to the resulting partial reaction product, and causing the said chlorinated acetamide to react with the said partial reaction product.

GAETANO F. D'ALELIO.

CERTIFICATE OF CORRECTION.

Patent No. 2,379,691.                            July 3, 1945.

GAETANO F. D'ALELIO.

It is hereby certified that error appears in the printed specification of the above numbered patent requiring correction as follows: Page 3, first column, line 3, after "acetic" insert a comma; line 14, for "derivatives" read --derivative--; and second column, line 50, for "stearic" read --stearate--; page 4, first column, line 63, after "benzene" strike out "and"; page 5, second column, line 42, for "poly-(N)carbinol" read --poly-(N-carbinol)--; line 45, for "subtsituted" read --substituted--; page 6, first column, line 50, for "poylvinyl" read --polyvinyl--; line 64, for "comphoric" read --camphoric--; and that the said Letters Patent should be read with this correction therein that the same may conform to the record of the case in the Patent Office.

Signed and sealed this 9th day of October, A. D. 1945.

Leslie Frazer (Seal)                         First Assistant Commissioner of Patents.